United States Patent

Hashizume et al.

[11] Patent Number: 5,873,538
[45] Date of Patent: Feb. 23, 1999

[54] MAGNETIC TAPE CASSETTE

[75] Inventors: Kenji Hashizume; Masatoshi Okamura; Haruo Shiba, all of Nagano-ken, Japan

[73] Assignee: TDK Corporation, Tokyo-to, Japan

[21] Appl. No.: 719,922

[22] Filed: Sep. 25, 1996

Related U.S. Application Data

[63] Continuation of Ser. No. 450,664, May 30, 1995, abandoned, which is a continuation of Ser. No. 047,358, Apr. 19, 1993, abandoned, which is a continuation of Ser. No. 775,033, Oct. 11, 1991, abandoned, which is a continuation-in-part of Ser. No. 508,687, Apr. 19, 1990, abandoned, which is a continuation-in-part of Ser. No. 508,687, Apr. 13, 1990, abandoned.

[30] Foreign Application Priority Data

Apr. 21, 1989 [JP] Japan ................................ 1-046253

[51] Int. Cl.⁶ ............................................... G11B 23/087
[52] U.S. Cl. ........................................................ 242/347.1
[58] Field of Search ............................... 242/347, 347.1; 360/132

[56] References Cited

U.S. PATENT DOCUMENTS

| | | | |
|---|---|---|---|
| 4,418,373 | 11/1983 | Fujimori et al. ................. | 242/199 X |
| 4,449,677 | 5/1984 | Ohta et al. ..................... | 242/199 |
| 4,541,581 | 9/1985 | Hara ........................... | 242/198 |
| 4,556,153 | 12/1985 | Takagi et al. ................... | 242/198 X |
| 4,631,619 | 12/1986 | Hashizume et al. ............... | 360/132 |
| 4,633,355 | 12/1986 | Harada ......................... | 242/198 X |
| 4,646,191 | 2/1987 | Goto ........................... | 242/199 X |
| 4,682,259 | 7/1987 | Okamura et al. ................. | 242/199 X |
| 4,698,713 | 10/1987 | Kawada ........................ | 242/198 X |
| 4,712,149 | 12/1987 | Goto et al. .................... | 242/199 X |
| 4,844,377 | 7/1989 | Shiomi et al. .................. | 242/198 |
| 4,865,265 | 9/1989 | Hashizume et al. . | |
| 4,881,696 | 11/1989 | Mizutani et al. ................ | 242/199 |
| 4,897,751 | 1/1990 | Goto ........................... | 360/132 |
| 4,930,714 | 6/1990 | Hashizume et al. . | |
| 4,973,012 | 11/1990 | Hashizume et al. ............... | 360/132 |
| 5,107,386 | 4/1992 | Hashizume et al. ............... | 360/132 |
| 5,209,426 | 5/1993 | Ogawa ......................... | 242/199 |
| 5,379,960 | 1/1995 | Kaneda et al. .................. | 242/345.2 |

*Primary Examiner*—John P. Darling
*Attorney, Agent, or Firm*—Oblon, Spivak, McClelland, Maier & Neustadt, P.C.

[57] ABSTRACT

A magnetic tape cassette capable of improving sealing of the tape cassette when it is out of use, to thereby positively protect a magnetic tape arranged therein. The magnetic tape cassette includes an openable front lid and a rear lid arranged so as to cover a front opening of the tape cassette casing and is so constructed that the front and rear lids are provided with facing portions, respectively, which are arranged so as to face each other along an arc defined by the facing portion of the rear lid when the rear lid is pivotally moved relatively to the front lid to cover the protecting space for the magnetic tape and each lid is formed into an arc or slanting plane, resulting in the lids being closely associated with each other to a degree sufficient to ensure satisfactory sealing of the cassette when the front lid is pivotally moved to cover the opening of the casing.

12 Claims, 8 Drawing Sheets

F I G. 2
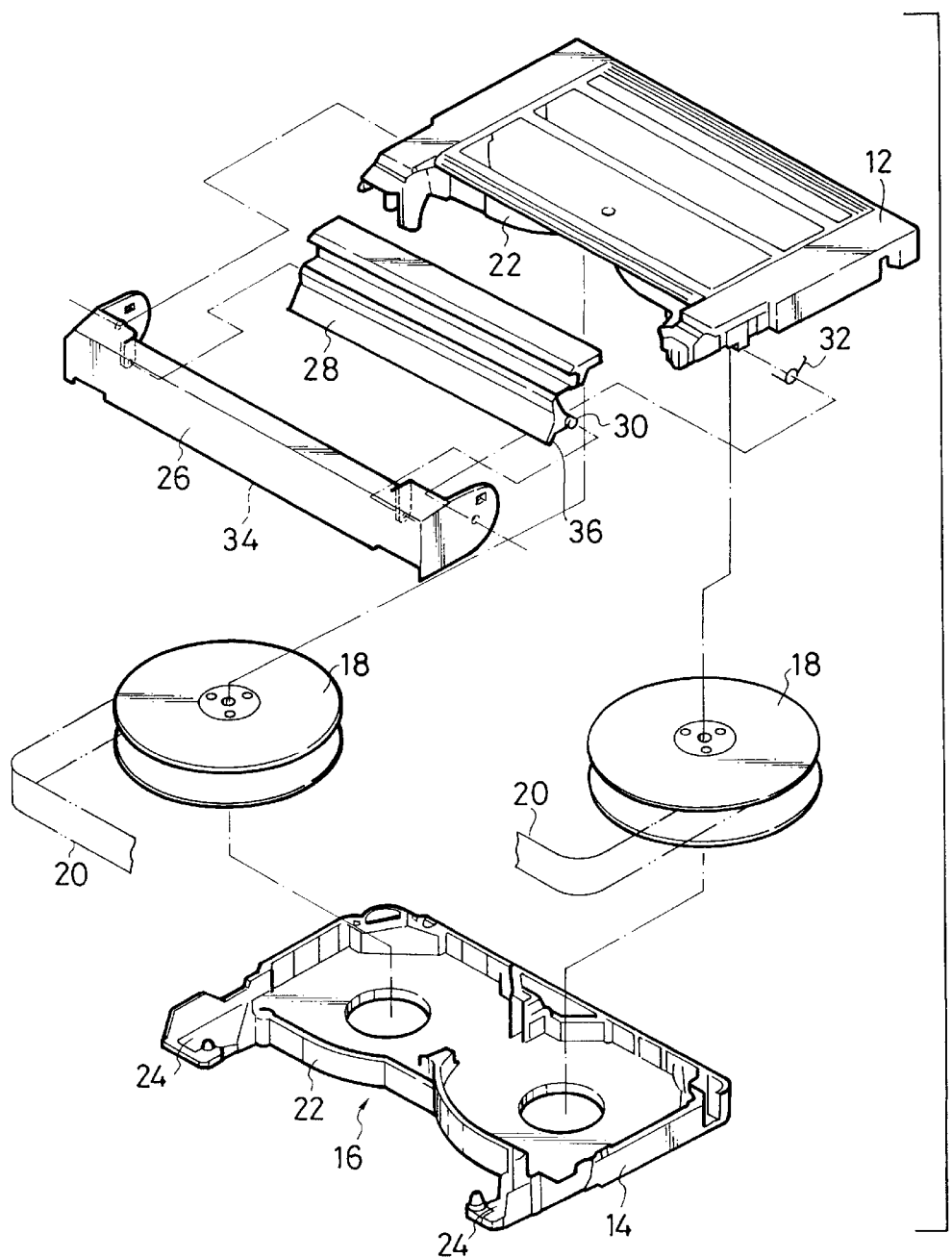

F I G. 5
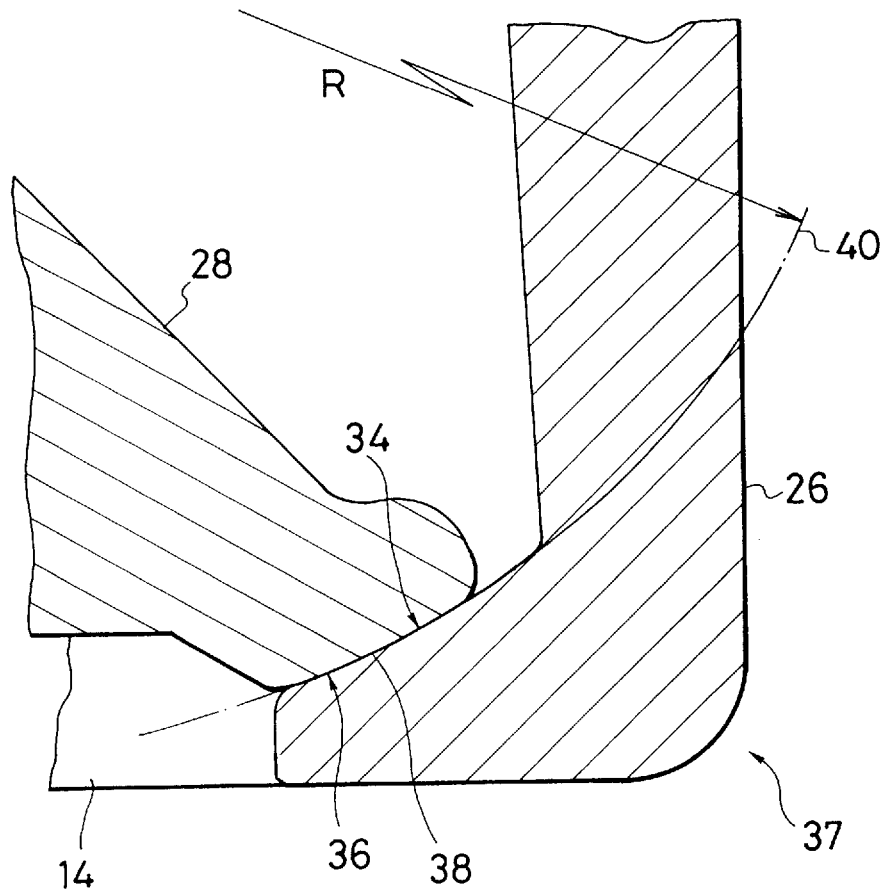

F I G. 7
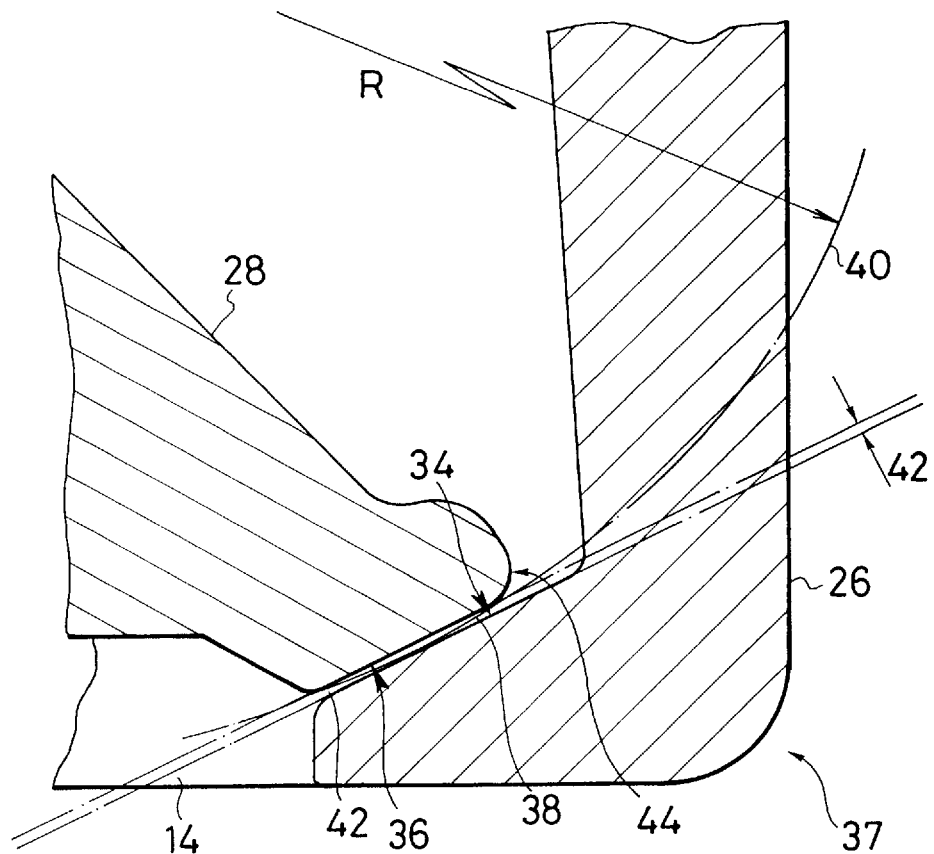

MAGNETIC TAPE CASSETTE

CROSS-REFERENCE TO RELATED APPLICATIONS

This application is a continuation of application Ser. No. 08/450,665, filed on May 30, 1995, now abandoned, which is a continuation application of Ser. No. 08/047,358, filed Apr. 19, 1993, abandoned, which is a continuation application of Ser. No. 07/775,033, filed Oct. 11, 1991, abandoned, which is a continuation-in-part application of Ser. No. 07/508,687, filed Apr. 13, 1990, also abandoned.

BACKGROUND OF THE INVENTION

This invention relates to a magnetic tape cassette suitable for use for a video tape recorder, an audio tape recorder or the like, and more particularly to a magnetic tape cassette which is provided on the front side thereof with a dust cover for selectively covering a front portion of a casing of the cassette.

In general, a tape cassette which has been conventionally used for a video tape recorder, an audio tape recorder or the like includes a cassette casing which is formed at the front portion thereof with an opening to run the magnetic tape. The casette casing is provided at the front portion thereof with a dust cover for selectively covering the front opening of the casing, which dust cover comprises a front lid pivotally mounted on the casing and a rear lid pivotally mounted on the front lid so both lids can be operated in association with each other to enclose the magnetic tape therebetween. The front and rear lids are constantly forced by an elastic force, to thereby close an enclosing space for the magnetic tape when the cassette is not being used. This results in dust or the like being prevented from sticking to the magnetic tape during nonuse of the cassette. Also, this closing allows the front and rear lids to protect the front and rear surfaces of a magnetic tape by interposing the tape therebetween, to thereby prevent a user from contacting the magnetic tape by mistake during handling of the tape cassette, so that the magnetic tape may escape damage, folds, adhesion of foreign matter such as oil or fingerprints thereto, or the like.

Also, in the conventional magnetic tape cassette constructed as described above, when the front lid is operated or pivotally moved to uncover the front opening of the casing, the rear lid is moved away from the magnetic tape, as it is associated with the movement of the front lid. In the operation of covering the front opening, the front lid and rear lid are brought together to envelope and protect the magnetic tape therebetween.

In the conventional tape cassette constructed in such a manner that, as shown in FIG. 1. the front lid 100 and rear lid 102 abut against each other at the association region 104 therebetween. A similar construction is shown in U.S. Pat. No. 4,418,373, FIGS. 4–6.

More particularly, in such prior art, the front lid is continuously biased by spring means to a closing direction, and eventually the lower end thereof comes in contact with the lower end of the rear lid to close the space for the magnetic tape during nonuse of the cassette.

However, when the tape cassette is inaccurately manufactured or assembled, parts other than the lower ends of the front and rear lids come in contact with each other earlier than the lower ends of the front and rear lids do. For example, in the case of FIG. 2, bottom edges of both side ends of the front lid 26 and upper surfaces of the ports 24, and in the case of U.S. Pat. No. 4,418,373, inclined surface portions 42, 44, 43 and 45 (FIG. 4, Col. 4, lines 18–20) correspond to the above described "other parts".

In such a case, the lower ends of the front and rear lids are left open, resulting in a sealing effect deteriorating and dust being allowed to enter the space for the magnetic tape during nonuse of the cassette.

In other words, in the prior art, the size of the gap between the lower ends of the front and rear lids changes depending on the relative rotating angle of the front and rear lids. The size of this angle depends on the accuracy of the manufacturing and assembling of the front and rear lids or other parts which will come into contact with each other when the front portion of the cassette is covered by the front and rear lids.

Therefore, in order to maintain the sealing effect of the lower ends of the front and rear lids, it has been necessary to manufacture and assemble the conventional tape cassette with high accuracy, thus causing the manufacturing cost of the tape cassette to increase.

Also, in the conventional magnetic tape cassette of the type, shown in U.S. Pat. No. 4,844,377, FIG. 11, and in Japanese Patent Publication No. 63-39995, FIGS. 5 to 8, the front lid is formed with a recess by removing the corner of the lower surface of the inner surface of the front lid and the rear lid is engaged with the front lid through the so-formed recess of the front lid to form a labyrinth path when the opening of the casing is closed by the lids, resulting in a disadvantage being encountered in that the front and rear lids are sometimes difficult to separate from each other by lifting up the front lid when preparing to operate the cassette, as labyrinth parts interfere with each other, due to inaccurate manufacturing or assembling.

In order to avoid such a problem, it is required to provide a certain degree of backlash between the front lid and the rear lid. However, the formation of such a backlash likewise deteriorates the form stability of the casing, resulting in a failure to satisfactorily close the casing. In particular, when the tape cassette is subjected to deformation, this clearance is easily increased by a slight movement of the front lid, resulting in a failure to prevent dust or the like from entering the casing and a deterioration in the form stability.

As described above, the conventional magnetic tape cassette fails to exhibit a dust function, due to the increase in the gap between the lower ends of the front and rear lids, which gap is a result of the relative displacement of the front and the rear lids, even if such a displacement is slight.

Accordingly, it would be highly desirable to develop a magnetic tape cassette which is capable of maintaining the sealing effect of the lower ends of the front and rear lids in good condition, even when the front lid is slightly displaced relative to the rear lid.

SUMMARY OF THE INVENTION

In accordance with the present invention, a magnetic tape cassette is provided. The magnetic tape cassette includes a casing in which a magnetic tape is rotatably arranged, and a front lid and a rear lid arranged so as to selectively cover a front portion of the casing and protect the magnetic tape. The front lid is pivotally mounted on the casing in a manner to be openable. The rear lid is pivotally mounted on the front lid through a pair of pivot pins, and slidably guided by a pair of guide grooves, so as to move in association with the movement of the front lid. The front lid and rear lid are provided with facing portions at their lower ends, respectively, which are arranged so as to face each other when the rear lid is pivotally moved relative to the front lid.

The facing portions of the front and rear lids face each other along an arc defined by the facing portion of the rear lid when the rear lid is pivotally moved about said pivot pins.

The facing portions of the front and rear lids are arranged so as to move relative to one another to overlap and face each other when the front lid is pivotally moved to cover the front portion of the casing and so as to face along an arc defined by a locus of the facing portion of the rear lid when the rear lid is pivotally moved relatively to the front lid.

Particularly, the facing portions of the front and rear lids are arranged so as to substantially coincide with or to be tangential to the arc, and so as to overlappingly move relative to each other along the arc.

Accordingly, a slight gap or a contact between the lower ends of the front and rear lids with each other can be maintained without change, as such a situation of the slight gap or contact is independent of the change in the relative angle of the front and rear lids. Therefore, the front and rear lids can maintain a good sealing effect at their lower ends, even when the tape cassette is not manufactured or assembled with very high accuracy.

In a preferred embodiment of the present invention, the mating section is defined by at least a part of the arc defined by the facing portion of the rear lid. The facing portions of the front and rear lids may both be formed into a configuration corresponding to the mating section. The facing portions of the front and rear lids may be arranged so as to lightly contact or closely face each other when the front lid is operated so as to cover the front portion of the casing. The facing portions of the front and rear lids may be formed with substantially the same curvature as the arc. Alternatively, the facing portions of the front and rear lids may be arranged so as to face each other through a slight gap when the front lid is operated so as to cover the front portion of the casing. In this instance, the facing portions of the front and rear lid may be formed with substantially the same curvature as the arc.

Alternatively, the facing portion of the front lid may be formed into a configuration corresponding to the mating section and the facing portion of the rear lid may be formed into a slanting plane extending in the tangential direction of said arc. The facing portions of the front and rear lids may be brought into contact with each other or separated from each other via a slight gap.

In another alternative, the facing portions of the front and rear lids may be formed into a slanting plane extending in the tangential direction of the arc and arranged so as to be separated from each other via a slight gap. The portion of the rear lid positioned outside the front end of the facing portion of the rear lid may be provided with a relief for preventing the facing portions of the front and rear lids from interfering with each other when the rear lid is pivotally moved.

Alternatively, the facing portion of the front lid is formed into the same curvature as the arc and the facing portion of the rear lid is formed into a slanting plane extending in the tangential direction of the arc, and the facing portions of the front and rear lids are arranged so as to be separated from each other by a slight gap.

Accordingly, it is an object of the present invention to provide a magnetic tape cassette which is capable of ensuring safety of the cassette both in use and out of use.

It is another object of the present invention to provide a magnetic tape cassette which is capable of improving sealing of the tape cassette when it is out of use.

It is a further object of the present invention to provide a magnetic tape cassette which is capable of positively protecting a magnetic tape arranged therein.

It is a still further object of the present invention to provide a magnetic tape cassette which is capable of significantly reducing the manufacturing cost thereof by decreasing the level of necessary accuracy for manufacturing and assembling the cassette.

Still other objects and advantages of the invention will become apparent after reference is made to the specification taken in connection with the accompanying drawings.

The invention accordingly comprises the features of construction, combination of elements, and arrangement of parts which will be exemplified in the construction hereinafter set forth, and the scope of the invention will be indicated in the claims.

BRIEF DESCRIPTION OF THE DRAWINGS

For a fuller understanding of the invention, reference is made to the following description taken in connection with the accompanying drawings; wherein:

FIG. 2 is an exploded perspective view showing an embodiment of a magnetic tape cassette according to the present invention;

FIG. 5 is a fragmentary enlarged sectional view showing an association region between the front lid and rear lid shown in FIG. 3;

FIG. 7 is a fragmentary enlarged view showing another modification of the association region shown in FIG. 5.

EMBODIMENT DESCRIPTION OF THE PREFERRED EMBODIMENTS

Figure 1:
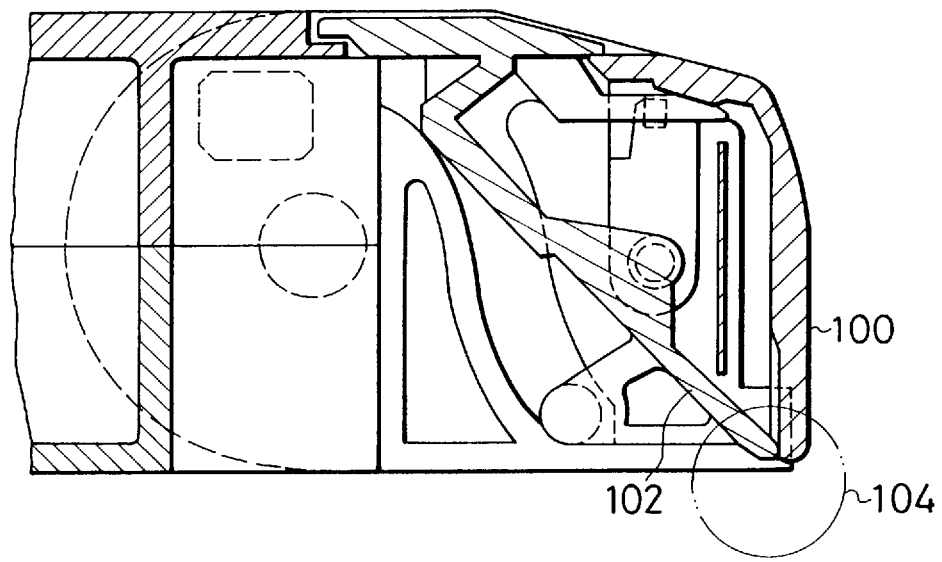
FIG. 1 is a fragmentary vertical sectional view showing the construction of a dust cover of a conventional magnetic tape cassette.
Figure 3:
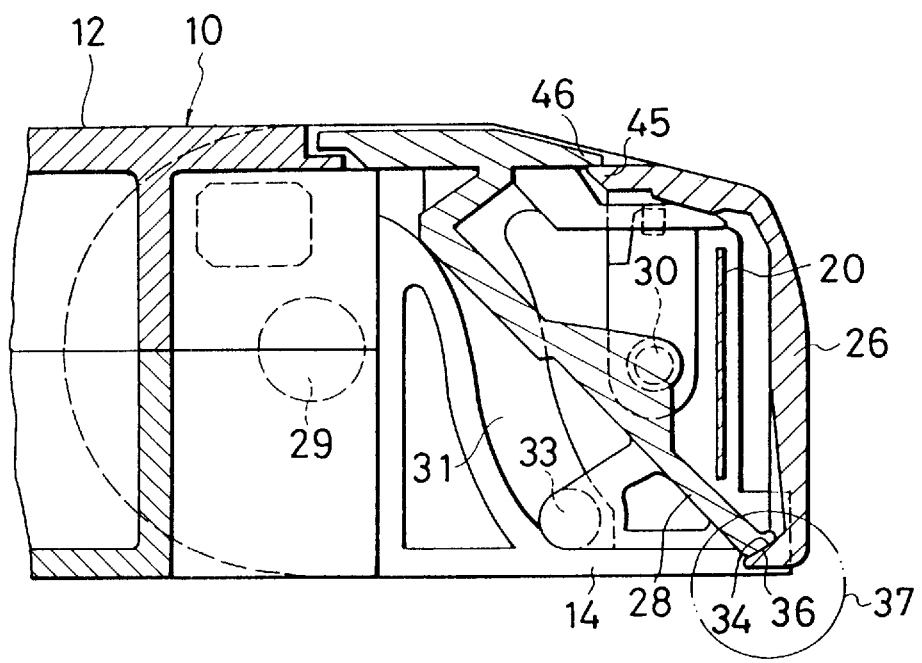
FIG. 3 is a fragmentary vertical sectional view showing the construction of front and rear lids of the magnetic tape cassette shown in FIG. 2.

Now, a magnetic tape cassette according to the present invention will be described hereinafter with reference to FIGS. 2 to 8, wherein like reference numerals designate like or corresponding parts throughout.

FIGS. 2 to 5 illustrate an embodiment of a magnetic tape cassette according to the present invention. A magnetic tape cassette of the illustrated embodiment includes a casing 10 which comprises an upper casing member 12 and a lower casing member 14 joined together by suitable means such as screws or the like to define a space in the casing 10 and is formed at the front portion thereof with an opening 16. In the casing 10 is rotatably arranged a pair of tape reels 18 on which a magnetic tape 20 is wound. The upper and lower casing members 12 and 14 are formed with vertical partitions 22 aligned with each other in a manner to be positioned back to the opening 16 when the casing members 12 and 14 are assembled together, so that the opening 16 is partitioned from the interior of the casing 10 by the partitions 22. Also, the upper and lower casing members 12 and 14 are each formed on both sides thereof with ports 24 in a manner to interpose the partition 22 therebetween, resulting in the opening 16 being communicated to the interior of the casing 10 through the ports 24. Such construction permits the portion of the magnetic tape 20 between the tape reels 18 to be led out through the ports 24 to the opening 16 defined by the partitions 22. Thus, the partitions 22 not only define a passage for the magnetic tape 20 but serve as a rear wall of the opening 16.

The magnetic tape cassette also includes an openable front lid 26 and a rear lid 28. The front lid 26 is pivotally mounted on the casing 10 through pivot pins 29 provided on inner sides of both sides of the front lid 26. The rear lid 28 is mounted pivotally on the front lid 26 through pivot pins 30, and rotates relative to the front lid 26. The rear lid 28 is also guided by guide grooves 31 by means of guide pins 33 which are provided on both sides of the rear lid 28. The rear lid 28 moves in response to the movement of the front lid 26 being guided by the guide grooves 31.

When the front lid 26 moves to cover or open the front side of the opening 16, the rear lid 28 moves correspondingly with the movement of the front lid 26, resulting in the magnetic tape being enveloped or exposed therebetween, thereby protecting the magnetic tape when the tape cassette is not being used.

The front lid 26 and rear lid 28 are provided with facing portions 34 and 36, respectively, which are adapted to face each other at an association region 37, when the front lid 26 is operated or pivotally moved to cover the front side of the opening 16. The facing portion 34 of the front lid 26 and the facing portion 36 of the rear lid 28 face each other along a mating section 38 extended along an arc 40 of a radius R defined by a locus of the facing portion 36 of the rear lid 28 when the rear lid 28 is pivotally moved about the pivot pins 30.

Figure 4:
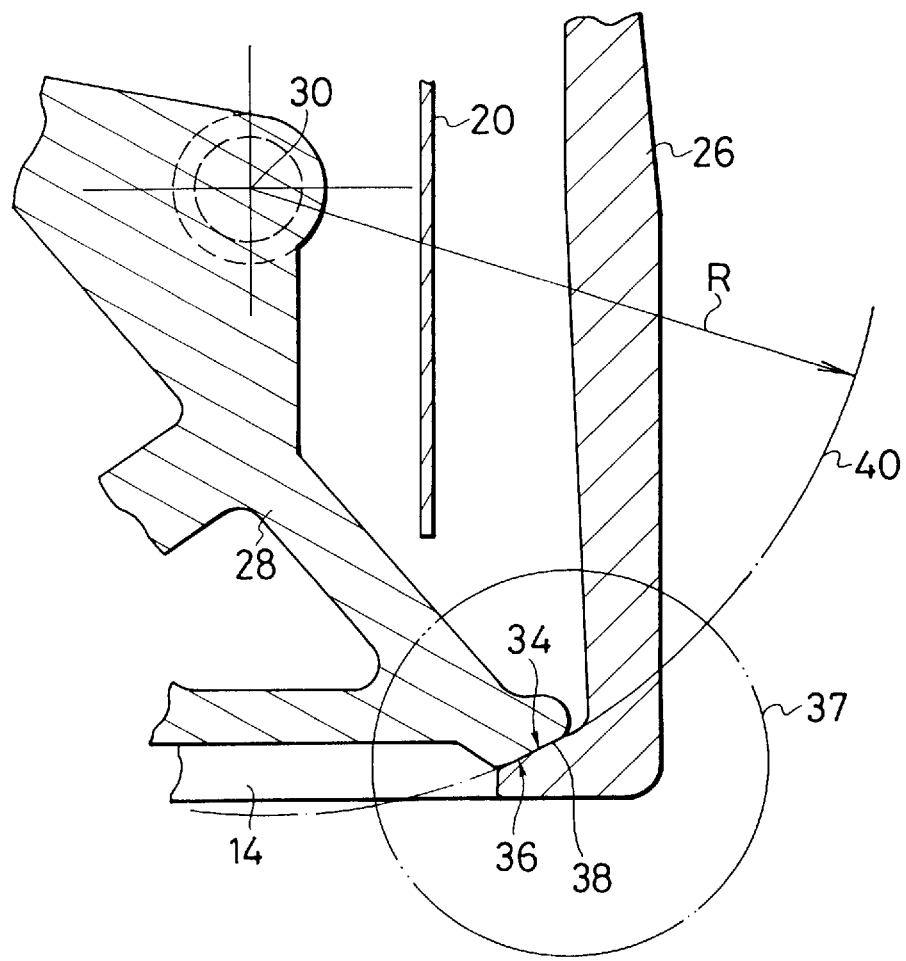
FIG. 4 is a fragmentary vertical sectional view showing an essential part of the construction shown in FIG. 3.

In the illustrated embodiment, the mating section 38, as is best seen in FIGS. 4 and 5 is defined so as to comprise at least a part of the arc 40 defined by the facing portion 36 of the rear lid 28 when the rear lid 28 is pivotally moved about the pivot pins 30. When the mating section 38 is thus defined, the facing portions 34 and 36 of the front and rear lids 26 and 28 may each be configured corresponding to the mating section 38 or a curved surface coinciding to the arc.

The front lid 26 is constantly biased in a direction for covering the front side of the opening 16 by a spring 32.

Further, the magnetic tape cassette of the illustrated embodiment includes a lock member (not shown) for keeping the front lid 26 locked when it covers the front side of the front opening 16 of the casing 10 and keeping the front lid 26 released when it opens the front lid 26.

In this embodiment, the facing portions 34 and 36 may be arranged so as to lightly contact each other on the mating section 38 when the front lid 26 is pivotally moved to cover the front side of the opening 16 of the casing 10, so that the rear lid 28 may be slidably moved with respect to the front lid 26. Alternatively, the facing portions 34 and 36 may face each other via a gap of a small size defined therebetween. Thus, the facing portions 34 and 36 of the front and rear lids 26 and 28 may be formed into the same curvature or radius as the arc 40.

Figure 6:
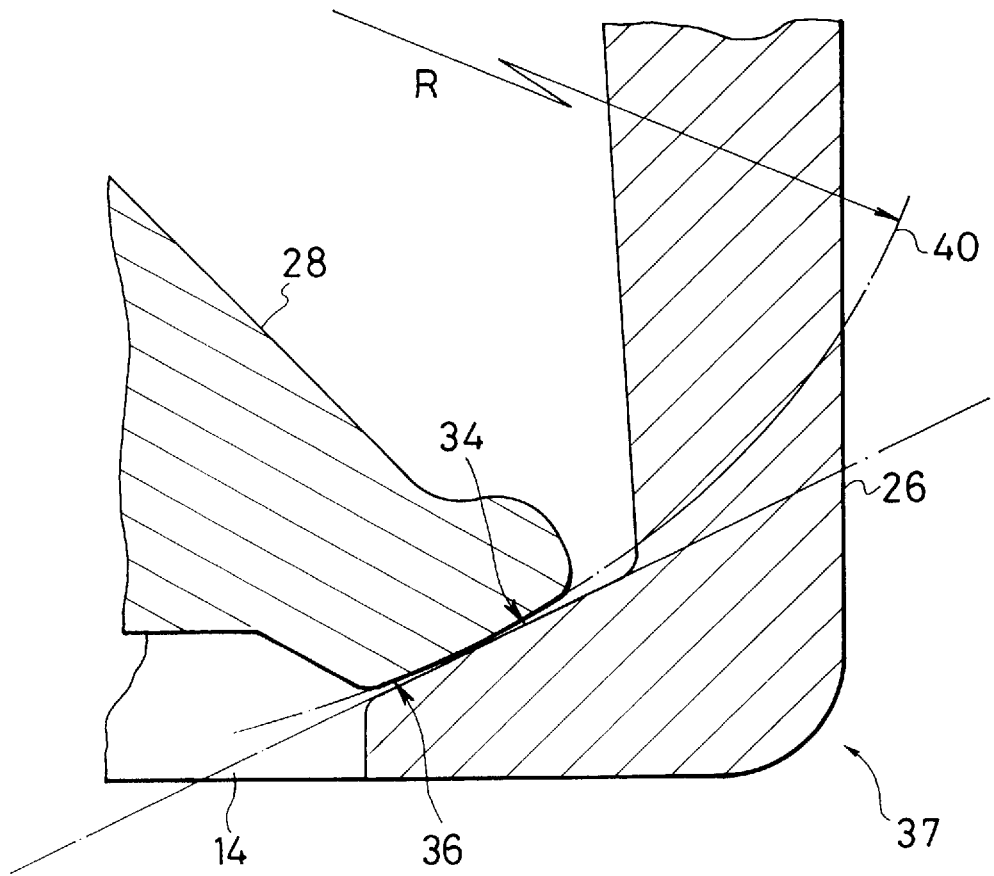
FIG. 6 is a fragmentary enlarged view showing a modification of the association region shown in FIG. 5.

Alternatively, the facing portions 34 of the front lid 26 may be formed into a slanting plane which extends in the tangential direction of the arc 40, as shown in FIG. 6. In this instance, the facing portions 34 and 36 may be arranged so as to lightly contact each other or face each other via a slight gap.

Also, the facing portions 34 and 36 of the front and rear lids 26 and 28 may be constructed in such a manner as shown in FIG. 7. In FIG. 7, the facing portions 34 and 36 are each formed into a slanting flat face or plane extending in the tangential direction of the arc 40 and a gap 42 of a slight size is defined between the facing portions 34 and 36. Also, the portion 44 of the rear lid 28 positioned outside the front end of the facing portion 36 of the rear lid 28 is provided with a relief as shown in FIG. 7 to thereby prevent the facing portions 34 and 36 of the front and rear lids 26 and 28 from interfering with each other when the rear lid 28 rotates relative to the front lid 26.

Figure 8:
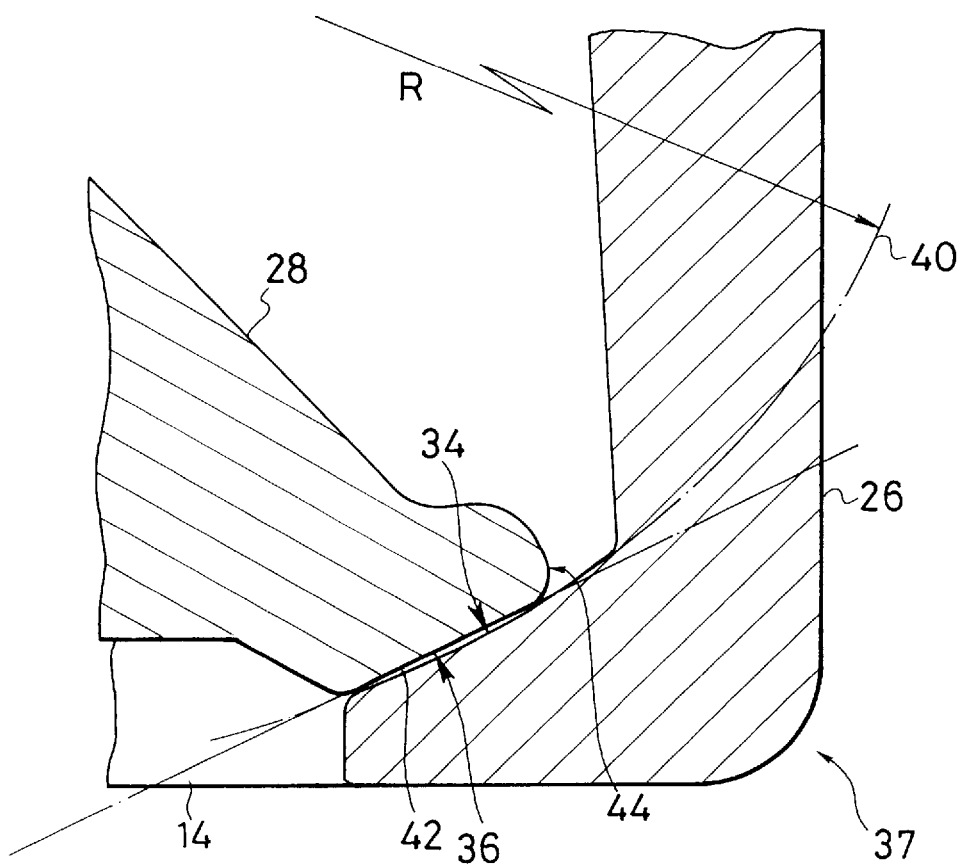
FIG. 8 is a fragmentary enlarged view showing a further modification of the association region shown in FIG. 5.

Alternatively, the embodiment, as shown in FIG. 8, may be modified in such a manner that the facing portion 36 of the rear lid 28 is formed into a slanting flat face or plane extending in the tangential direction of the arc 40 and the facing portion 34 of the front lid 26 may be formed into substantially the same curvature as the arc 40, with a gap 42 of a slight size being formed therebetween to prevent interference therebetween when the front lid 26 is operated.

As can be seen from the foregoing, the present invention is so constructed that the front and rear lids are provided with facing portions, respectively, which are arranged so as to face each other along an arc defined by the facing portion of the rear lid when the rear lid is pivotally moved relative to the front lid 26 and each lid coincides to an arc or slanting plane tangential to the arc. Such construction of the present invention permits the front and rear lids to satisfactorily envelope the magnetic tape with a good sealing effect, even when the front and rear lids are closed in a manner to be deviated from the normal position due to the dimensional distortion of the lids, caused by, e.g., inaccurate manufacturing or assembling or by eternal force.

For example, if the front lid 26 or the rear lid 28 is erroneously manufactured, upper ends 45 and 46 of the front and rear lids 26 and 28 come into contact with each other at a relative rotating angle of the front and rear lids 26 and 28, which angle may be different from the designed normal angle. Even in such a case, the sealing condition at the lower ends of the front and rear lids 26 and 28 does not change and a good sealing effect is maintained, because the sealing condition is independent of the relative angle of the front and rear lids 26 and 28.

Also, the upper ends 45 and 46 of the front and rear lids 26 and 28 can be surely brought into contact with each other by means of the spring 32 during non-use of the cassette, because the lower ends of the front and rear lids 26 and 28 do not prevent the upper ends 45 and 46 from touching each other.

Also, such construction of the present invention effectively prevents the front and rear lids from interfering with each other when the front and rear lids are pivotally moved, to thereby ensure a smooth and safe operation of the cassette.

In the case where facing portions of the upper ends 45 and 46 do not abut but are facing each other along the arc 40, the facing portions 34 and 36 of the front and rear lids 26 and 28 show the same sealing effect independent of the change of the relative angle between the front and rear lids 26 and 28, as described above. In this case, some stopper means are necessary for defining the relative stop position between the front and rear lids 26 and 28.

It will thus be seen that the objects set forth above, among those made apparent from the preceding description, are efficiently attained and, since certain changes may be made in the above construction without departing from the spirit and scope of the invention, it is intended that all matter contained in the above description or shown in the accompanying drawings shall be interpreted as illustrative and not in a limiting sense.

It is also to be understood that the following claims are intended to cover all the generic and specific features of the invention herein described and all statements of the scope of the invnetion which, as a matter of language, might be said to fall therebetween.

What is claimed is:

1. A magnetic tape cassette comprising:

a casing in which a magnetic tape is arranged; and a front lid and a rear lid arranged so as to selectively cover a front portion of said casing and protect said magnetic tape, said front lid being pivotally supported on said casing, said rear lid being pivotally supported on said front lid and being movable in connection with the movement of said front lid, said front lid and rear lid extending substantially from an upper end of said casing to a lower end of said casing, wherein:

said front lid and rear lid are provided with facing portions at their lower ends, respectively, wherein the facing portions have substantially similarly curved surfaces opposed to one another and face each other along a curved mating section which extends along an arc of a radius defined by a locus of the facing portion of the rear lid when the rear lid is pivotally moved so as to seal said facing portions when contacted together.

2. A magnetic tape cassette as defined in claim 1, wherein said facing portions of said front and rear lids are formed so as to substantially coincide to said arc.

3. A magnetic tape cassette as defined in claim 1, wherein said facing portions of said front and rear lids are arranged so as to contact each other when said front lid is operated so as to cover said front portion of said casing.

4. A magnetic tape cassette as defined in claim 3, wherein said facing portions of said front and rear lids are formed into substantially a same curvature as said arc.

5. A magnetic tape cassette comprising:

a casing in which a magnetic tape is arranged; and a front lid and a rear lid arranged so as to selectively cover a front portion of said casing and protect said magnetic tape, said front lid being pivotally supported on said casing, said rear lid being pivotally supported on said front lid and movable in connection with the movement of said front lid, said front lid and rear lid extending substantially from an upper end of said casing to a lower end of said casing, wherein:

said front lid and rear lid are provided with facing portions at their lower ends, respectively, said facing portions being arranged so as to relatively move to overlap and face each other when said front lid is pivotally moved to cover said front portion of said casing and to face along an arc defined by a locus of said facing portion of said rear lid when said rear lid is pivotally moved; and said facing portions of said front and rear lids are arranged so as to face each other via a gap when said front lid is operated so as to cover said front portion of said casing.

6. A magnetic tape cassette as defined in claim 5, wherein said facing portions of said front and rear lids are formed into substantially the same curvature as said arc.

7. A magnetic tape cassette comprising:

a casing in which a magnetic tape is arranged; and a front lid and a rear lid arranged so as to selectively cover a front portion of said casing and protect said magnetic tape, said front lid being pivotally supported on said casing, said rear lid being pivotally supported on said front lid and movable in connection with the movement of said front lid, said front lid and rear lid extending substantially from an upper end of said casing to a lower end of said casing, wherein:

said front lid and rear lid are provided with facing portions at their lower ends, respectively, said facing portions being arranged so as to relatively move to overlap and face each other when said front lid is pivotally moved to cover said front portion of said casing and to face along an arc defined by a locus of said facing portion of said rear lid when said rear lid is pivotally moved; and said facing portion of said front and rear lid is formed into a same curvature as said arc and said facing portion of said rear lid is formed into a slanting plane extending in a tangential direction of said arc.

8. A magnetic tape cassette as defined in claim 7, wherein said facing portions of said front and rear lids are arranged so as to contact each other.

9. A magnetic tape cassette as defined in claim 7, wherein said facing portions of said front and rear-lids are separated from each other via a gap.

10. A magnetic tape cassette comprising:

a casing in which a magnetic tape is arranged; and a front lid and a rear lid arranged so as to selectively cover a front portion of said casing and protect said magnetic tape, said front lid being pivotally supported on said casing, said rear lid being pivotally supported on said front lid and movable in connection with the movement of said front lid, said front lid and rear lid extending substantially from an upper end of said casing to a lower end of said casing to a lower end of said casing, wherein:

said front lid and rear lid are provided with facing portions at their lower ends, respectively, said facing portions being arranged so as to relatively move to overlap and face each other when said front lid is pivotally moved to cover said front portion of said casing and to face along an arc defined by a locus of said facing portion of said rear lid when said rear lid is pivotally moved; and said facing portions of said front and rear lids are formed into a slating plane extending in a tangential direction of said arc and arranged so as to be separated from each other via a gap.

11. A magnetic tape cassette as defined in claim 10, wherein a front end portion of said facing portion of said rear lid is provided with a relief for preventing said facing portions of said front and rear lids from interfering with each other when said front lid is pivotally moved.

12. A magnetic tape cassette comprising:

a casing in which a magnetic tape is arranged; and a front lid and rear lid arranged so as to selectively cover a front portion of said casing and protect said magnetic tape, said front lid being pivotally supported on said casing, said rear lid being pivotally supported on said front lid and being movable in connection with the movement of said front lid, said front lid and rear lid extending substantially from an upper end of said casing to a lower end of said casing, wherein:

said front lid and rear lid are provided with facing portions at their lower ends, respectively said facing portions being arranged so as to relatively move to overlap and face each other when said front lid is pivotally moved to cover said front portion of said casing and to face along an arc defined by a locus of said facing portion of said rear lid when said rear lid is pivotally moved wherein said facing portions of said front and rear lids are formed so as to be tangential to said arc.

* * * * *